United States Patent
Murouchi et al.

(10) Patent No.: US 6,296,950 B2
(45) Date of Patent: Oct. 2, 2001

(54) METHOD OF PRODUCING THERMOTROPIC LIQUID CRYSTALLINE COPOLYESTER, THERMOTROPIC LIQUID CRYSTALLINE COPOLYESTER COMPOSITION OBTAINED BY THE SAME METHOD, AND MOLDING MADE OF THE SAME COMPOSITION

(75) Inventors: Satoshi Murouchi; Yoshikuni Yamada, both of Kanagawa-ken; Toshitaka Kobayashi, Chiba-ken, all of (JP)

(73) Assignee: Nippon Petrochemical Co., LTD, Tokyo (JP)

( * ) Notice: Subject to any disclaimer, the term of this patent is extended or adjusted under 35 U.S.C. 154(b) by 0 days.

(21) Appl. No.: 09/809,520

(22) Filed: Mar. 15, 2001

Related U.S. Application Data

(62) Division of application No. 09/538,623, filed on Mar. 29, 2000.

(30) Foreign Application Priority Data

Mar. 30, 1999 (JP) .................................................. 11-88111
Mar. 30, 1999 (JP) .................................................. 11-88217

(51) Int. Cl.$^7$ ........................... B32B 15/08; C08G 63/00
(52) U.S. Cl. ......................... 428/626; 528/176; 528/193; 528/194; 528/206; 528/287; 428/458; 428/480; 428/537.1; 428/545; 428/620
(58) Field of Search .................................... 528/176, 193, 528/194, 206, 287; 428/458, 480, 537.1, 545, 620, 626; 252/299.01

(56) References Cited

U.S. PATENT DOCUMENTS

| | | | | |
|---|---|---|---|---|
| 4,841,014 | * | 6/1989 | Brodowski | 528/191 |
| 5,015,722 | * | 5/1991 | Charbonneau et al. | 528/190 |
| 5,071,942 | * | 12/1991 | Brewbaker et al. | 528/193 |
| 5,079,289 | * | 1/1992 | Layton et al. | 524/600 |
| 5,492,946 | * | 2/1996 | Huspenl et al. | 524/12 |
| 5,798,432 | * | 8/1998 | Lee et al. | 528/176 |

* cited by examiner

*Primary Examiner*—Samuel A. Acquah
(74) *Attorney, Agent, or Firm*—Dilworth & Barrese

(57) ABSTRACT

A method of producing a thermotropic liquid crystalline copolyester having an extremely small amount of out-gases comprising the steps of: (1) charging in a reactor 5–100 mol % of aromatic hydroxycarboxylic acid, 0–47.5 mol % of aromatic dicarboxylic acid and 0–47.5 mol % of aromatic diol, so that the sum of mol % of each material is 100 mol % and the molt of aromatic dicarboxylic acid and that of aromatic diol are substantially equal; (2) adding acetic anhydride of an amount which satisfies the formula, $(B-C)/A \geq 1.04$, "A" representing the total molar number of the hydroxy group in a reaction system, "B" representing the molar number of acetic anhydride to be added, and "C" representing the molar number of water present in the reaction system prior to addition of acetic anhydride; (3) acetylation; (4) melt polymerization; and (5) solid-phase polymerization.

3 Claims, No Drawings

METHOD OF PRODUCING THERMOTROPIC LIQUID CRYSTALLINE COPOLYESTER, THERMOTROPIC LIQUID CRYSTALLINE COPOLYESTER COMPOSITION OBTAINED BY THE SAME METHOD, AND MOLDING MADE OF THE SAME COMPOSITION

This application is a Division of Ser. No. 09/538,623 filed Mar. 29, 2000.

BACKGROUND OF THE INVENTION

1. Field of the Invention

The present invention relates to a method of producing a thermotropic liquid crystalline copolyester which the amount of corrosive out-gases emitted in a high temperature environment is extremely small, a thermotropic liquid crystalline copolyester resin composition obtained by the method, and a resin molded article made of the same resin composition for use in electrical/electronic components. More specifically, the present invention relates to a method of producing a thermotropic liquid crystalline copolyester which the amount of corrosive out-gases (such as acetic acid and phenol) emitted in a high temperature environment is extremely small due to the setting of the amount of acetic anhydride in the reaction system in which acetylation is carried out before polymerization to a specific range, a thermotropic liquid crystalline copolyester resin composition which the amount of corrosive out-gases (such as acetic acid and phenol) emitted in a high temperature is further extremely small and is made by mixing a specific phosphate compound to a thermotropic liquid crystalline copolyester resin obtained by the same method, and a resin molded article made of the same resin composition for use in electrical/electronic components.

2. Description of the Related Art

It has been recognized that thermotropic liquid crystalline copolyesters made by known methods tend to emit corrosive out-gases which corrode metal-made conductive portions (e.g. an electronic circuit) of an electric/electronic component in a high temperature environment (such as soldering and mounting-to-surface processes). Corrosiveness of such corrosive out-gases has been recognized as a serious problem in such cases. Studies have revealed that the main component of such corrosive out-gases is generally acetic acid (refer to, for example, JP-A 8-53543).

Specifically, in electric/electronic components having metal-made conductive portions which is vulnerable to the gases emitted from a thermotropic liquid crystalline copolyester resin (such as a relay, a switch, a connector, a socket, a resistor, a condenser, a motor, an oscillator, a print circuit board, and a power module), the metal-made conductive portions are oxidized and a corrosive film is formed thereon by the corrosive out-gases and the like due to heat history during the mounting-to-surfaces process. As a result, failure in the conductive portions may occur. In addition, in a case in which the electrical/electronic component has an electric contact which is operated in a mechanical manner, a failure in contact may occur due to formation of layers of carbonized materials in the contact portion (the layers are formed mainly in the contact portion by discharge during the contact operation).

The corrosion of this type has particularly been a serious problem in components such as a relay and a switch in which good contact properties must be maintained for a long period.

Recently, thermotropic liquid crystalline copolyesters are also used in various components in HDD (e.g. a carriage, a chassis and a VCM coil holding member for an actuator, a member for installing a head in a non-operationphase and the like), in FDD and in similar components in an optical disc drive and the like. With respect to the magnetic or optical data reading portions which are essential to these devices, deterioration of performances due to corrosive out-gases emitted from the resin are now likewise being concerned.

As thermotropic liquid crystalline copolyesters can be molded so as to have thin walls (i.e. these copolyesters have excellent molding/fluxional properties) and have excellent soldering properties (i.e. these copolyesters have excellent heat resistance properties), they have been employed as forming materials of various electric/electronic components so that excellent dimensional precision obtained in the copolyesters be most advantageously utilized. In addition, the electric/electronic components are now required to be far smaller and operated at a lower voltage. Accordingly, formation of corrosive film and generation of layers of carbonized materials as described above could cause much worse, more often initial failures or malfunction in these electric/electronic components than now. Therefore, there is a demand for a thermotropic liquid crystalline copolyester which the amount of corrosive gases is extremely small. This may be especially a concern in a relay component and a switch component. Note that the layers of carbonized materials are formed in these components probably because the corrosive out-gases are carbonized by arc discharge and deposited, causing abnormality in conductance.

As methods for reducing corrosive out-gases from thermotropic liquid crystalline copolyester, there have been proposed a method of blending a gas absorbing material (JP-A 8-333505), a method of blocking the end of the molecular chain with mono-functional monomer (JP-A 3-203925, JP-A 4-249528 and JP-A 8-53543). However, these methods are not necessarily satisfactory.

These conventional methods propose, assuming that the main component of the corrosive gases is acetic acid emitted from the thermotropic liquid crystalline copolyester, techniques for suppressing the generation of acetic acid and capturing the generated acetic acid. However, it has not been determined what actually are the corrosive out-gases which cause corrosive damages to metal-made conductive portions of electric/electronic components. Therefore, although emission of acetic acid is prevented, it does not necessarily mean that a thermotropic liquid crystalline copolyester which is satisfactory in terms of its corrosive out-gas effect on an electric/electronic component can be obtained. Especially, if the technique pays too much attention to suppression of acetic acid emission and rather increases emission of other corrosive out-gases, such technique or methods inevitably have to face a serious limitation.

With respect to this problem, the inventors have discovered that thermotropic liquid crystalline copolyester may emit phenol, which is corrosive and could be carbonized, together with acetic acid in a high temperature environment. Based on this discovery, the inventors were convinced that a thermotropic liquid crystalline copolyester which the amount of corrosive out-gases is very small and thus can be used as a reliable forming material for an electric/electronic component (in other words, a thermotropic liquid crystalline copolyester which satisfies the demand from an electric/electronic component) is effected by suppressing the generation of phenol. The present invention was completed as a result of industrious study according to this theory.

The detailed mechanism in which corrosive out-gases are emitted from thermotropic liquid crystalline copolyester is not known yet. The inventors, however, discovered for the first time in the world that the amount of emission of both corrosive out-gases (acetic acid and phenol) can be suppressed by setting the amount of acetic anhydride in the reaction system in which acetylation is carried out before polymerization within a specified range, resulting in the present invention.

Generation of corrosive gases tends to be accelerated by the existence of inorganic or organic fillers blended into the copolyester. In the case of engineering plastics such as thermotropic liquid crystalline copolyester, inorganic or organic fillers are normally blended in practice. Accordingly, it is required that generation of corrosive gases be reliably suppressed in the resins in which inorganic or organic fillers are blended.

The inventors of the present invention have achieved reliably suppressing generation of out-gases at a practically acceptable level in the resin compositions in which fillers are blended, by adding a specific phosphate compound into a thermotropic liquid crystalline copolyester obtained by the aforementioned method.

OBJECTS OF THE INVENTION

One object of the present invention is to provide a method of producing a thermotropic liquid crystalline copolyester which the amount of corrosive out-gases (such as acetic acid and phenol) in a high temperature environment is extremely small, a resin composition containing a thermotropic liquid crystalline copolyester obtained by the method, and electric/electronic components formed by molding the resin composition. Another object of the present invention is to reliably suppress generation of out-gases at a practically acceptable level in the resin compositions in which fillers are blended.

SUMMARY OF THE INVENTION

As a result of assiduous study carried out by the inventors in order to achieve the aforementioned objects, it has been discovered that the amount of emission of corrosive out-gases (both acetic acid and phenol) can be suppressed by setting the amount of acetic anhydride in the reaction system in which acetylation is carried out prior to polymerization within a specific range. The present invention was completed on the basis of this discovery (method).

In addition, the inventors of the present invention have discovered that a more excellent thermotropic liquid crystalline copolysester which the amount of corrosive out-gases emitted in a high temperature environment is extremely small can be obtained by blending a specific phosphate compound into the thermotropic liquid crystalline copolysester obtained by the method. This discovery also contributes to the completion of the present invention.

Accordingly, in the first aspect of the present invention, a method of producing a thermotropic liquid crystalline copolyester which the amount of out-gases is extremely small comprises the steps of: (1) feeding in a reactor 5–100 mol % of aromatic hydroxycarboxylic acid, 0–47.5 mol % of aromatic dicarboxylic acid and 0–47.5 mol % of aromatic diol, so that the sum of molt of each material is 100 mol % and the mol % of aromatic dicarboxylic acid and that of aromatic diol are substantially equal; (2) adding acetic anhydride of an amount which satisfies the formula below, (B−C)/A≧1.04

"A" represents the total molar number of the hydroxy group in a reaction system, "B" represents the molar number of acetic anhydride to be added, and "C" represents the molar number of water present in the reactions system prior to addition of acetic anhydride; (3) acetylation; (4) melt polymerization; and (5) solid-phase polymerization.

In the second aspect of the present invention, a thermotropic liquid crystalline copolyester resin composition comprises: (1) 100 parts by weight of the thermotropic liquid crystalline copolyester obtained by said method of producing a thermotropic liquid crystalline copolyester; and (2) 0.001–1 parts by weight of at least one phosphate ester having the general formula:

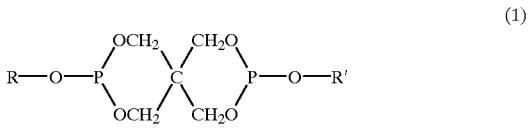

(1)

In the formula, R and R' each represent a group selected from the group consisting of alkyl group, alkenyl group, aryl group and aralkyl group. R and R' may represent the same group.

DETAILED DESCRIPTION OF THE INVENTION

The present invention will be described in detail hereinafter.

In a producing method of the present invention, as a first step (1), 5–100 mol % of aromatic hydroxycarboxylic acid, 0–47.5 mol % of aromatic dicarboxylic acid and 0–47.5 mol % of aromatic diol are charged in a reactor, so that the sum of mol % of each material is 100 mol % and the mol % of aromatic dicarboxylic acid and that of aromatic diol are substantially equal. Types of the reactor and methods of charging the reaction materials are not particularly limited and any suitable known methods may be employed.

Monomers charged as the materials are, specifically, monomers which are derived to a repeating structural unit shown in formulae (2) to (4) below.

  (2)

  (3)

  (4)

The monomer derived to the repeating unit of (2) is an aromatic hydroxycarboxylic acid. Examples of the aromatic hydroxycarboxylic acid include p-hydroxybenzoic acid, 2-hydroxy-6-naphthoic acid, m-hydroxybenzoic acid and the like. These examples may be used solely or in combination. Preferably, p-hydroxybenzoic acid or a combination of p-hydroxybenzoic acid and 2-hydroxy-6-naphthoic acid are used.

The monomer derived to the repeating unit of (3) is an aromatic dicarboxylic acid. Examples of the aromatic decarboxylic acid include terephthalic acid, isophthalic acid, 2,6-dicarboxynaphthalene, 4,4'-biphenyldicarboxylic acid and the like. These monomers may be used solely or in combination. Preferably, terephthalic acid or a combination of terephthalic acid and isophthalic acid are used.

The monomer constituting the repeating unit of (4) is an aromatic diol. Examples of the aromatic diol include 4,4'-biphenol, hydroquinone, 2,6-dihydroxynaphthalene and the like. These monomers may be used solely or in combination.

Preferably, 4,4'-biphenol or a combination of 4,4'-biphenol and hydroquinone are used.

In the thermotropic liquid crystalline copolyester produced by the present invention, the preferable examples of monomer combination include:
1. p-hydroxybenzoic acid, terephthalic acid, p,p'-biphenol
2. p-hydroxybenzoic acid, terephthalic acid and isophthalic acid, p,p'-biphenol
3. p-hydroxybenzoic acid, terephalic acid and isophthalic acid, p,p'-biphenol and hydroquinone
4. p-hydroxybenzoic acid and 2-hydroxy-6-naphthoic acid
5. p-hydroxybenzoic acid and 2-hydroxy-6-naphthoic acid, terephalic acid and isophthalic acid, p,p'-biphenol
6. p-hydroxybenzoic acid, terephthalic acid, isophthalic acid, 2,6-dicarboxynaphthalene, p,p'-biphenol The amount of the repeating structural unit (2) derived from the aromatic hydroxy acid such as p-hydroxybenzoic acid of the present invention is preferably set within the range of 5 to 100 mol % of the structure unit as a whole of the copolyester produced by the method of the present invention. When the amount of the repeating structural unit (2) is less than 5 mol %, the melting point of the copolyester rises up and the fluxional properties and the mechanical strength thereof deteriorate. This is not preferable.

Examples of more preferable combinations of the monomers include: aromatic hydroxycarboxylic acid containing 90–100 mol % of p-hydroxybenzoic acid and 0–10 mol % of other aromatic hydroxycarboxylic acid (the sum of each mol % is 100 mol %); aromatic dicarboxylic acid containing 45–100 molt of terephthalic acid and 0–55 mol % of other aromatic dicarboxylic acid (the sum of each mol % is 100 mol %); and aromatic diol containing 60–100 mol % of p,p'-biphenol and 0–40 mol % of other aromatic diol (the sum of each mol % is 100 mol %).

Examples of the most preferable combinations of the monomers include: aromatic hydroxycarboxylic acid containing 90–100 mol % of p-hydroxybenzoic acid and 0–10 mol % of 2-hydroxy-6-naphthoic acid (the sum of each mol % is 100 mol %); aromatic dicarboxylic acid containing 45–100 mol % of terephthalic acid and 0–55 mol % of isophthalic acid (the sum of each mol % is 100 mol %); and aromatic diol containing 60–100 mol % of p,p'-biphenol and 0–40 mol % of hydroquinone (the sum of each mol % is 100 mol %).

By employing these preferable monomer combinations, the balance between the molding/fluxional properties, the heat resistance properties and the mold processing temperature is further improved, enabling more excellent adaptation and performances when the resulting resin composition is molded to form an electric/electronic component having thin walls. In addition to the aforementioned effect, the shear stress history during the molding process is reduced, the stability in a high temperature environment and at the mold processing temperature is increased and the basic properties of suppressing the emission of corrosive out-gases are improved, further enhancing the effect of the present invention.

With respect to the monomers and acetic anhydride (described in detail below), those which are industrially available may directly be used. The monomers may be dried before charging into the reactor or the monomers may be dried after being charged into the reactor. One example of a method of drying the monomers after the monomers are charged into the reactor is follows. The temperature of the materials is raised to 70° C. or so and then the "pressure reduction and nitrogen injection" process is repeated several times with stirring. By carrying out this process for several hours, nitrogen-substitution and drying of the monomers are effected. Normally, drying in such a manner is sufficient in order to achieve the task. In a case in which the process is carried out in a batch system, catalysts, stabilizer and the like may be charged into the reaction reactor according to necessity. As the catalysts, types thereof are not particularly limited and any suitable known catalysts may be used.

The reactions (including the acetylation step and the melt polymerization step described below) may be carried out in a batch system or in a continuous system.

In the step (1), the monomers of predetermined type are charged into the reactor and heated according to necessity. Thereafter, as the step (2), the amount of water contained in the reaction system is measured prior to charging of acetic anhydride.

Specifically, the factor to be first selected and controlled among the variable factors associated with the reaction system in which acetylation is carried out is the amount of acetic anhydride to be charged next. The amount of acetic anhydride to be charged next is expressed by the following relationship, given that the total molar number of the hydroxy group of the monomers present in the reation system when the acetylation reaction is started is represented as "A" and the molar number of acedic anhydride is represented as "B" and the molar number of water present in the reaction system before the addition of acetic anhydride is represented by "C".

$$(B-C)/A \geq 1.04$$

In the present invention, it is more preferable that "A", "B" and "C" satisfy the following formula:

$$1.04 \geq (B-C)/A \geq 1.08$$

The value (B–C)/A is a parameter for determining the amount to be added of acetic anhydride. When the value of the parameter is less than 1.04, the amount of emission of phenol gas may increase and thus such a value is not desirable. When the value of the parameter is larger than 1.08, the amount of emission of acetic acid gas may significantly increase and thus such a value is not desirable, either. In short, as long as the value of the parameter is no less than 1.04, it is possible to suppress emission of phenol gas at a practically acceptable level, although a large amount of fillers has not been blended into the molded body.

In the present invention, in order to effect the aforementioned control on the parameter, the amount of water present in the reaction system must be known and thus the water content in the reaction system is measured prior to the starting of the acetylation process. As the method of measuring the water content, any suitable known method may be employed as long as the method allows reliable measurement of water of a very small amount (ppm or so). Specifically, Karl Fischer's method may be employed as the method of measuring the amount of water.

In the present invention, the amount of water contained in the reaction system is measured prior to adding acetic anhydride. Even in case in which the monomers are dried before being charged (refer to the description above), a constant amount of water is still detected from the reaction system in a normal condition. The amount of water detected in such a case is normally 0.2 weight % or so at the maximum.

One of the important features of the present invention lies in that the amount of $H_2O$ present in the reaction system is measured in the step (2) and the amount of acetic anhydride to be consumed as a result of the reaction between acetic anhydride and H$_2$O is calculated, in order that the amount of acetic anhydride be increased as much as the calculated amount of acetic anhydride to be consumed. Because of this, in a case in which a batch system is employed, a portion of the charged liquid is taken out as a sample from the reactor prior to the starting of the acetylation reaction and the amount of water contained therein is measured accurately. Note that any other suitable methods of measuring water content may be employed.

Acetic anhydride added in step (2) is added in order to acetylate the hydroxyl group of the monomers. Acetic anhydride easily reacts with H$_2$O and is decomposed to acetic acid. Accordingly, when water is present in the reaction system, acetic anhydride immediately reacts with this water and is decomposed to acetic acid. As a result, the amount of acetic anhydride which is substantially involved with the reaction in the acetylation process is reduced. It should be noted that the amount of H$_2$O present in the reaction system significantly varies depending on the method of producing the monomers, the conditions during storage, moisture in air, whether or not the monomers are dried in producing copolyester, the degree of drying and the like. Therefore, the amount of acetic anhydride to be added in producing thermotropic liquid crystalline copolyester should be determined in consideration of the amount of H$_2$O contained in the monomers.

When acetic acid is generated as a result of the reaction between acetic anhydride and water, acetylation should be carried out by this newly produced acetic acid as well (at least theoretically). However, the actual rate of acetylation reaction of the hydroxyl group of the monomers caused by acetic acid is very slow, although the same reaction caused by acetic anhydride proceeds quickly. Accordingly, when the remaining amount of acetic anhydride is scant, the rate of acetylation of the hydroxyl group of monomers during the acetylation process drops, making the rate of polymerization lower. In addition, the amount of acetic anhydride not only affects the rate of polymerization, but also affects as a key factor the emission amount of the out-gases (acetic acid and phenol, especially) from the obtained copolyester.

In short, the amount of acetic anhydride is calculated so that the effective amount of acetic anhydride satisfies the aforementioned conditions, a specific amount of acetic anhydride is charged in the step (2) based on the calculated value, and then the acetylation process is carried out as the step (3).

The acetylation process is carried out with heating so that the refluxphase of acetic anhydride is maintained. The acetylation process is completed in 1–10 hours in a batch system, normally.

In the present invention, in addition to the aforementioned relationship of the molar ratio, it is preferable that the acetylation process is carried out without discharging acetic acid out of the reaction system during the process and, after completing the acetylation process, the next melt polymerization reaction as the step (5) immediately follows without removing excess acetic anhydride and acetic acid generated by the acetylation process.

In other words, the acetylation process as described above is carried out without discharging acetic acid in a reaction system in which adequately excessive acetic anhydride is present, and the process is immediately shifted to the polymerization reaction. As a result, the following effects that: (1) material balance in the system can be maintained constant; (2) influence of water can be reliably eliminated by carrying out removal of water contained in the system by acetic anhydride under heating; (3) the whole amount of the added acetic anhydride can be effectively utilized in the acetylation reaction; and (4) occurrence of excessive generation of oligomer can be suppressed, are probably obtained.

Although the relationship between these effects and the suppression of emission of the corrosive out-gases (acetic acid and phenol) is not clear, it is assumed that, due to the improvement of the acetylation rate of the monomer groups before polymerization, the suppression of generation of oligomers and the like, the polymerization reaction afterwards uniformly proceeds. It is also assumed that, by setting the value of (B–C)/A at 1.08 or less, the control of the side-reaction between acetic anhydride molecules and the reduction of remaining acetic anhydride and remaining acetic acid are effected.

After completing the acetilation process, a copolyester can be produced by the step (4) in which the temperature is raised so that acetic acid is removed by distillation and, simultaneously with the removal of the acetic acid, the melt polycondensation is carried out. In a case in which p-hydroxybenzoic acid, terephthalic acid, isophthalic acid and 4,4'-biphenol are used as the materials, a copolyester can be produced by distillating acetic acid within a temperature range of 150–350° C. and performing, simultaneously with the removal of acetic acid, the melt polycondensation. The duration of polymerization can be selected within the range of 1 hour to dozens of hours.

In the melt polymerization step (5), the reaction base materials themselves act as reaction solvents. Accordingly, polymerization can be effected without using reaction solvents in particular.

Suitable catalysts may be used in the acetylation process and/or the polymerization process. The known catalysts for polycondensation of conventional polyesters may be used. Examples of these catalysts include: metal salt catalysts such as magnesium acetate, tin (I) acetate, tetrabutyl titanate, lead acetate, sodium acetate, potassium acetate, antimony trioxide and the like; and organic compound catalysts such as N-methyl imidazol. The catalyst for the acetylation process may be the same one as that for the polymerization process. Or, different catalysts may be used for each process. Normally, the catalysts are charged with the monomers when the monomers are charged at the step (1) and used for the acetylation and the polymerization without being removed.

With respect to the polymerization reactor used for the melt polymerization at the step (4), types thereof are not limited in particular. However, the reactor is preferably a polymerization reactor of stirring reactor type having a stirring equipment used for high viscosity reaction in general. Such a stirring equipment includes a stirring device of various configuration (anchor-shape, multi-step-shape, spiral-shape, spiral shaft-shape and the like) and a stirring device as a modification of the aforementioned stirring device. More specifically, the polymerization reactor is preferably selected from a Warner-type mixer, a Banbury mixer, a pony type mixer, Muller mixer, a roll mill, a kneader which can be continually operated, a pug mill, a gear compounder and the like. The reactor for the acetylation process and the polymerization reactor for the melt polymerization need not be different and the same one reactor may be used for the two processes.

The polymers obtained by the melt polymerization at the step (4) may further be subject to solid-phase polymerization. In the solid-phase polymerization process, the polymer is first taken out of the melt polymerization process at the step (4) and preferably milled to a powdery or flake-state.

The polymer milled in such a manner is then subject to solid-phase polymerization at the step (5) according to a known solid-phase polymerization method. In a specific example of the solid-phase polymerization method, the polymer is subject to a heat treating in a solid-phase for 1–30 hours within a temperature range of 200–350° C. in an inert atmosphere such as nitrogen. The solid-phase polymerization process may be carried out with stirring or the same process may be carried out without stirring. The melt polymerization and the solid polymerization may be carried out in the same one reactor, if the reactor is provided with a suitable stirring mechanism.

After the solid-phase polymerization, the obtained thermotropic liquid crystalline copolyester may be polletized in a known method, so that the molding process can be effected using such a pellet.

The amount of out-gases such as acetic acid and phenol emitted from the thermotropic liquid crystalline copolyester obtained as described above is very small. The specific emission limits applied to the out-gases are different depending on the type of the electric/electronic component. In the case of acetic acid, the emission thereof is preferably 20 ppm or less and in the case of phenol, the emission thereof is preferably 5 ppm. When acetic acid and phenol of amounts which exceed these limits (20 ppm, 5 ppm) are emitted, the possibility that an electric/electronic component molded from the thermotropic liquid crystalline copolyester experiences operational failures becomes high, which is not desirable.

In addition, the thermotropic liquid crystalline copolyester produced as descirbed above exhibits further more excellent properties with respect to an emission-suppression effect of the corrosive out-gases in a high temperature environment, by adding one or more phosphate esters as shown in the formula (1) below.

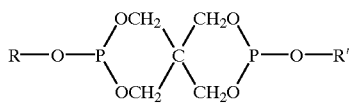

(1)

(In the formula, R and R' each represent a group selected from the group consisting of alkyl group, alkenyl group, aryl group and aralkyl group. The number of carbon atoms of R or R' is within the range of 1 to 50. R and R' may represent the same group.)

Those having a pentaerythritol structure is preferred.

Specific examples of phosphate esters include bis(2,6-di-tert-butyl-4-methylphenyl) pentaerythritol diphosphite, bis (2,4-di-tert-butylphenyl) pentaerythritol diphosphite, distearyl pentaerythritol diphosphite, bis(dodecyl) pentaerythritol diphosphite.

Blending of the phosphate esters may be carried out either in the acetylation process or in the polymerization process. However, it is preferable to blend the phophite esters into the polymers when the solid-phase polymerization is completed. Addition of the phosphate esters after the completion of the solid-phase polymerization is preferable because the out-gas reduction effect by the addition of the phosphate esters is further enhanced in that case. The phosphate esters may blended into the polymers according to a standard method. The timing of adding the phosphate esters may be selected from suitable timings after the aforementioned solid-phase polymerization. For example, the phosphite ester may be added with other fillers which will be described below (or separately with these other fillers) when the thermotropic liquid crystalline polyester is pelletized after the solid-phase polymerization.

The amount of the phosphate ester to be blended in the present invention is preferably within the range of 0.001–1 parts by weight with respect to 100 parts by weight of the thermotropic liquid crystalline polyester. In a case in which the amount of the phosphate ester blended into the polymer is less than 0.001 parts by weight, emission of phenol gas is not sufficiently reduced. On the other hand, in a case in which the amount of the phosphate ester blended into the polymer is more than 1 part by weight, emission of gases resulting from the decomposition of the phosphate ester increases and causes an opposite effect, which is not desirable. The amount of the phosphate ester blended into the polymer is most preferably within the range of 0.01–0.5 parts by weight with respect to 100 parts by weight of the thermotropic liquid crystalline polyester.

The thermotropic liquid crystalline copolyester obtained from the production method of the present invention may be used for various purposes. Organic or inorganic fillers in a fiber, powder, particle or platephase may generally be blended into the thermotropic liquid crystalline copolyester in order to increase the mechanical strength of the copolyester.

Examples of the fillers in a fiber state include glass fiber, asbestos fiber, silica fiber, silica alumina fiber, potassium titanate fiber, carbon or graphite fiber, and fibrous materials made of metal such as aluminum, titanium, copper or the like. A representative example thereof is glass fiber.

On the other hand, examples of the fillers in a particle state include carbon black, graphite, silica, quartz powder, glass beads, milled glass fiber, glass balloon, glass powder, calcium silicate, aluminum silicate, talc, clay, silicates such as diatomaceous earth, wollastonite, or various metal containing powders such as iron oxides, titanium oxides, zinc oxides, antimony trioxide, alumina, calcium sulfate and others.

Examples of the fillers in a plate state include mica, glass flake, various metal foils and the like.

In addition, examples of the organic fillers include fibers thermalty stable high performance made of aromatic polyester, aromatic polyimide and polyamide and the like.

These fillers may be treated with the conventional surface treatment agents prior to the use according to necessity. In a case of using fibrous fillers, a binder may be used as well.

In addition, an appropriate amount of various conventional additives such as antioxidant, heat stabilizer, weight-increasing agent, reinforcing agent, pigment, flame retardant agent and the like may be added. These additives and fillers may be used as a combination of two or more of additives and fillers.

When the fillers are used, the amount of the fillers blended into the composition is to be within the range of 10 weight % to 90 weight % (preferably 80 weight %) of the composition overall. When the fillers is blended more than 90 weight % of the composition, the mechanical strength of the composition undesirably deteriorates. The fillers may be blended according to a known method. Whatever method is employed, the fillers are blended into the resin produced as a result of the solid-phase polymerization. As described above, the phophite esters may be added simultaneously with (or separately from) the adding of the fillers.

The thermotropic liquid crystalline copolyester resin composition produced by the method of the present invention as described above may be subject to the conventional molding method including the standard melt molding processing such as extrusion molding, injection molding, compression molding, blow molding and the like, such that the resin can be processed to molded articles such as fibers, films, three-dimensional molded articles, containers, hoses and the like.

The molded articles obtained in such a manner may be subject to a heat treatment so that strength thereof be increased. Elasticity thereof can often be increased at the same time by such a heat treatment. The heat treatment may be carried out by heating the molded articles at a temperature no higher than the melting point of the polymer in an inert atmosphere (e.g. nitrogen, argon, helium or the like) or in an atmosphere containing oxygen (e.g. air) or in an environment in which pressure has been reduced.

The thermotropic liquid crystalline copolyester of the present invention does not substantially emit or emits an extremely small amount of corrosive gases in a long-term use or in the use under a high-temperature environment (the soldering processing, the mounting-to-surface processing, for example). Accordingly, when the thermotropic liquid crystalline copolyester is used as a forming material of a member in which the corrosive out-gases emitted from the resin portion is problematic, various functions of the member can be reliably maintained without suffering from damages due to the corrosive out-gases.

For example, when the thermotropic liquid crystalline copolyester of the present invention is employed as a forming material of various components used in HDD (a carriage, a chassis, a VCM coil holding portion of an actuator, a member for accommodating a head in an non-operation state), FDD and an optical disc drive, the amount of the corrosive out-gases emitted from these components is significantly decreased and thus the stability in the data-reading function is improved.

Especially, when the thermotropic liquid crystalline copolyester is employed in electric/electronic components having a metal-made conductive portion which is vulnerable to the corrosive gases emitted from the resin (such as a relay, a connector, a socket, a resistor, a condenser, a motor, an oscillator, a printed circuit board, and a power module), the various functions of these components can be reliably maintained without suffering from damages due to the corrosive out-gases. Specifically, in an electric/electronic component made of thermotropic liquid crystalline copolyester and having electric contact portions (such as a relay, a switch and the like), problems like an initial failure caused by the formation of a corrosive film as a result of oxidization of the contact portion by the corrosive out-gases and the like and an contact failure caused by the formation of layers of carbonized materials at the application of voltage can be solved. In other words, the functions of the component can be reliably maintained. Therefore, it is preferable that the resin portion of such an electric/electronic component as described above is formed by the thermotropic liquid crystalline copolyester obtained by the method of the present invention.

When such the electric/electronic component as described above is produced by using thermotropic liquid crystalline-line copolyester, known molding methods including the insert molding method by injection molding, the encapsulating method or the like may be employed.

EXAMPLES

The present invention will be described far more in detail by the following examples.

It should be noted that, as a result of the measurement according to a standard method, each thermotropic liquid crystalline copolyester obtained by each of the following examples and comparative examples showed optically anisotropic properties when it was molten.

Method of Measurement

The property values shown in the examples were measured according to the following method.

(1) Melting Point

Measurement of the melting point was carried out, using α-alumina as a reference material, by a DSC in which a differential scanning calorimeter manufactured by Seiko Denshi Kogyo Co. was used. The temperature was raised from the room temperature to 420° C. at the rate of 20° C./minute so that the polymer was completely melted. The temperature was then dropped to 150° C. at the rate of 10° C./minute. The temperature was again raised to 430° C. at the rate of 20° C./minute and the peak temperature observed in the heat absorption peak was recorded as the melting point.

(2) Apparent Viscosity

In measurement of the apparent viscosity, a capillary leometer manufactured by Intesco Co. (Model 2010) was employed. A capillary whose diameter was 1.0 mm, length was 40 mm and entrance angle was 90° was used. Measurement was carried out at a shear rate of 100 $sec^{-1}$ from the temperature which was 30° C. below the melting point measured by DSC, by heating so that the temperature was increased at a constant rate (specifically, at a temperature-increasing rate of +4° C./minute). The apparent viscosity was obtained at a predetermined temperature.

(3) Water Content in the Monomer

Water content was measured at 175° C. by collecting about 2 g of the monomer and using a Karl Fischer's method water content measuring device (Model VA-05) manufactured by Mitsubishi Kasei Co.

(4) Amount of Out-gases

The obtained thermotropic liquid crystalline copolyester was subject to melt mixing and kneading by an extruder at a temperature around the melting point in order to produce pellets. The obtained pellets were milled in the order of 1 mm or less. The resulting product was heat-treated at 150° C. for 24 hours and the amounts of acetic acid and phenol gases generated after the heat treatment were each measured by a gas chromatography.

Specific examples of measuring acetic acid and phenol gases include a method in which the product produced by milling the pellets was air-tightly sealed in a vial bottle of 20 ml, subject to a heat processing at 150° C. for 24 hours, and the amounts of the out-gases are each obtained by analyzing the emitted gases by a gas chromatography. Examples of the method of injecting the gases in the vial bottle into a gas chromatography device include a method in which injection is manually carried out by a syringe and a method in which injection is carried out by a head space sampler. In order to enhance the measurement precision, it is preferable to use a head space sampler.

The type of the vial bottle, the aluminum cap, a septum and the like used in this measurement are not particularly limited as long as they are adaptable to a heat processing at 150° C. and any suitable models commercially available can be employed. In addition, the type of the column used for the gas chromatography analysis is not particularly limited as long as it allows a quantitative analysis of acetic acid and phenol. However, a non-polar column is preferable. Examples of preferable columns include a glass column G-100 manufactured by Kagakuhin Kensa Kyokai (Chemicals Testing Association). The conditions on temperature during measurement are not particularly limited as long as these conditions allow the separation of the peaks of acetic acid and phenol and the quantitative analysis thereof. Specific example of these condition include a condition in which the temperature is raised from 45° C. to 280° C. at a temperature-increasing rate of 20° C./minute.

The measurement of the amount of the out-gases was actually carried out under the following conditions.

(Pellets for measurement and the method for measurement)

The pellets were milled by a mill having 1 mm φ mesh. The milled product was air-tightly sealed in a vial bottle of 20 ml and subject to a heat treatment at 150° C. for 24 hours. The amount of the acetic acid and phenol gases emitted as a result of heating were quantitatively measured by a gas chromatography (HP6890) connected to a head space sampler (HP7694) manufactured by Hewlett Packard Co. As the column, G-100 (40 m) manufactured by Kagakuhin Kensa Kyokai was employed. With respect to the other conditions, the initial temperature was 45° C., the temperature-increasing rate was 20° C./minute, the final temperature was 280° C., the pressure of helium was 8.3 psi and the split ratio was 2.0. Measurement was carried out by a FID detection device.

(Molded sample for measurement)

The injection molding from the pellets was carried out by an injection molding device manufactured by Niigata Tekkojo Co. (MIN-7) in the conditions in which the molding temperature was 380° C., the injection pressure 869 kg/cm², the injection rate 69.5 mm/sec, the dwelling pressure 790 kg/cm², the injection time 3 seconds, the cooling time 12 seconds and the mold temperature 150° C. As a result, a testing piece (20 mm×50 mm×1 mm thickness) for a tensile test was obtained. Using this testing sample, the amount of emission of the out-gases was measured in a manner similar to that described above.

In a case in which the fillers such as milled glass fiber are blended into the composition, emission of the out-gases are more likely to occur as compared with a case in which the fillers are not blended (this fact has been confirmed from the experiences in the past). Therefore, in the examples described below, the tests related to the out-gas emission were carried out using samples containing the fillers, in order that the comparison of the out-gas emission between the examples be easier).

Example 1

A polymerization reactor made of SUS316 as a material and having a double-helical stirring wing (manufactured by Nitto Koatsu Co.) was used. Nitrogen-substitution was carried out by repeating the process of "pressure reduction of the polymerization reactor and nitrogen injection into the reactor" five times. Then, 1,330.10 g (9.63 moles) of p-hydroxybezoic acid (HBA) manufactured by Ueno Seiyaku Co., 79.99 g (0.4815 moles) of isophthalic acid (IPA) manufactured by A.G. International Co., 453.29 g (2.7285 moles) of terephthalic acid (TPA) maufactured by Mitsui Sekiyu Kagaku Kogyo Co., 597.73 g (3.21 moles) of p,p'-biphenol (BP) manufactured by Honshu Kagaku Kogyo Co. and 0.35 g of magnesium acetate as a catalyst manufactured by Tokyo Kasei Co. were charged in the polymerization reactor and the monomers in the polymerization reactor were mixed by stirring at the rotation rate of the stirring wing of 50 rpm. 2 g of the monomer mixture in the polymerization reactor was taken out of the reactor and the water content therein was measured. 0.176 weight % of water content was detected in the monomer mixture. In other words, 4.33 g (0.24 moles) of H₂O was present in the polymerization reactor.

The monomer which had been taken out of the reactor for the measurement of water content therein was returned to the polymerization reactor and 1,769.22 g (17.33 moles) of acetic anhydride manufactured by Chisso Co. was added to the polymerization reactor. The temperature of the mixture was raised to 150° C. in 1 hour at the rotation rate of the stirring wing of 100 rpm and the acetylation reaction was carried out for 2 hours with acetic anhydride being refluxed. After the acetylation reaction was completed, the temperature was raised at the rate of 0.5° C./minute in a state in which distillation of acetic anhydride was allowed. The resulting polymers were taken out of the outlet provided at the lower portion of the polymerization reactor at 330° C.

The polymers which had been taken out of the reactor were milled by a mill in the order of 1 mm or less and the solid-phase polymerization was carried out by a solid-phase polymerization device having a cylindrical rotational reactor manufactured by Asahi Garasu Co. Specifically, the polymers which had been milled as described above were charged into the reactor, the nitrogen was circulated at a rate of 1 litter/minute and the temperature was raised to 280° C. in 2 hours at a rotation rate of 20 rpm. The temperature was kept at 280° C. for 1 hour, raised to 300° C. in 30 minutes and kept at the temperature for 4 hours. The product was then cooled to the room temperature in 1 hour, resulting in the aimed polymer.

The melting point of the obtained polymer was 376° C. when measured by DSC. The apparent viscosity at the temperature of 410° C. was 1,110 poise.

30 weight % of milled glass fiber (MJH20JMH-1-20) manufactured by Asahi Fiber Glass Co. was blended into 70 weight % of the obtained thermotropic liquid crystalline copolyester. The mixture was compounded by a twin-screw extruder of 30 mm φ (PCM-30) manufactured by Ikegai Tekko Co. in which the maximum temperature of the cylinder was set at 400° C. The composition in which 30 weight % of glass fiber was blended (pellet) was obtained. A testing piece for measurement of the out-gases was injection-molded from this pellet according to the aforementioned molding method.

Similarly, 0.1 weight % of bis(2,6-di-tert-butyl-4-methylphenyl) pentaerythritol diphosphite as the phosphate ester (manufactured by Asahi Denka Kogyo Co., which will be referred to as "P-1" hereinafter) was blended into the mixture of the thermotropic liquid crystalline copolyester and the milled glass fiber. Another pellet was thus obtained and from this pellet, another testing piece for measurement of the out-gases was produced.

The effective amount of acetic anhydride is shown in Table 1. The measurement results of the out-gases from the pellet and the molding (the testing piece) made from the composition in which 30 weight * of glass fiber was blended are shown in Table 2.

Example 2

A device which was similar to that used in Example 1 was employed. 1,330.10 g (9.63 moles) of p-hydroxybezoic acid (HBA), 79.99 g (0.4815 moles) of isophthalic acid (IPA), 453.29 g (2.7285 moles) of terephthalic acid (TPA), 597.73 g (3.21 moles) of p,p'-biphenol (BP) and 0.35 g of magnesium acetate as a catalyst were charged in the polymerization reactor. The temperature in the polymerization reactor was raised to 70° C. and the process of "pressure reduction ad nitrogen injection" was repeated five times with rotating the stirring wing at 50 rpm, effecting the nitrogen substitution and the drying of the monomers in 2 hours. After the drying of the monomers was completed, 2 g of the monomer mixture in the polymerization reactor was taken out of the reactor and the water content therein was measured. 0.015 weight % of water content was detected in the monomer mixture. In other words, 0.37 g (0.02 moles) of $H_2O$ was present in the polymerization reactor.

The monomer which had been taken out of the reactor for the measurement of water content therein was returned to the polymerization reactor and 1,739.61 g (17.04 moles) of acetic anhydride was added to the polymerization reactor. The temperature of the mixture was raised to 150° C. in 1 hour at the rotation rate of the stirring wing of 100 rpm and the acetylation reaction was carried out for 2 hours with acetic anhydride being refluxed. After the acetylation reaction was completed, the temperature was raised at the rate of 0.5° C./minute in a state in which distillation of acetic anhydride was allowed. The resulting polymers were taken out of the outlet provided at the lower portion of the polymerization reactor at 330° C.

The polymers which had been taken out of the reactor were milled by a mill in the order of 1 mm or less and the solid-phase polymerization was carried out by a solid-phase polymerization device having a cylindrical rotational reactor. Specifically, the polymers which had been milled as described above were charged into the reactor, the nitrogen was circulated at a rate of 1 litter/minute and the temperature was raised to 280° C. in 2 hours at a rotation rate of 20 rpm. The temperature was kept at 280° C. for 1 hour, raised to 300° C. in 30 minutes and kept at the temperature for 4 hours. The product was then cooled to the room temperature in 1 hour, resulting in the aimed polymer.

The melting point of the obtained polymer was 375° C. when measured by DSC. The apparent viscosity at the temperature of 410° C. was 930 poise.

30 weight % of the same milled glass fiber as used in Example 1 was blended into 70 weight % of the obtained thermotropic liquid crystalline copolyester. The mixture was compounded by a twin-screw extruder of 30 mm φ (PCM-30) in which the maximum temperature of the cylinder was set at 400° C. The composition in which 30 weight % of glass fiber was blended (pellet) was obtained. A testing piece for measurement of the out-gases was injection-molded from this pellet according to the aforementioned molding method.

Similarly, 0.1 weight % of the phosphate ester P-1 was blended into the mixture of the thermotropic liquid crystalline copolyester and the milled glass fiber. Another pellet was thus obtained and from this pellet, another testing piece for measurement of the out-gases was produced.

The effective amount of acetic anhydride is shown in Table 1. The measurement results of the out-gases from the pellet and the molded testing piece made from the composition in which 30 weight % of glass fiber was blended are shown in Table 2.

Example 3

A device which was similar to that used in Example 1 was employed. Nitrogen substitution was carried out by repeating the process of "pressure reduction and nitrogen injection" of the polymerization reactor five times. 1,330.10 g (9.63 moles) of p-hydroxybezoic acid (HBA), 132.90 g (0.80 moles) of isophthalic acid (IPA), 400.37 g (2.41 moles) of terephthalic acid (TPA), 597.73 g (3.21 moles) of p,p'-biphenol (BP) and 0.35 g of magnesium acetate as a catalyst were charged in the polymerization reactor. The monomers in the polymerization reactor were mixed by stirring at the rotating rate of the stirring wing of 50 rpm. 2 g of the monomer mixture in the polymerization reactor was taken out of the reactor and the water content therein was measured. 0.200 weight % of water content was detected in the monomer mixture. In other words, 4.92 g (0.27 moles) of $H_2O$ was present in the polymerization reactor.

The monomer which had been taken out of the reactor for the measurement of water content therein was returned to the polymerization reactor and 1,785.55 g (17.49 moles) of acetic anhydride was added to the polymerization reactor. The temperature of the mixture was raised to 150° C. in 1 hour at the rotation rate of the stirring wing of 100 rpm and the acetylation reaction was carried out for 2 hours with acetic anhydride being refluxed. After the acetylation reaction was completed, the temperature was raised at the rate of 0.5° C./minute in a state in which distillation of acetic anhydride was allowed. The resulting polymers were taken out of the outlet provided at the lower portion of the polymerization reactor at 330° C.

The polymers which had been taken out of the reactor were milled by a mill in the order of 1 mm or less and the solid-phase polymerization was carried out by a solid-phase polymerization device having a cylindrical rotational reactor. Specifically, the polymers which had been milled as described above were charged into the reactor, the nitrogen was circulated at a rate of 1 litter/minute and the temperature was raised to 290° C. in 2 hours at a rotation rate of 20 rpm. The temperature was kept at 290° C. for 6 hours and the product was cooled to the room temperature in 1 hour, resulting in the aimed polymer.

The melting point of the obtained polymer was 356° C. when measured by DSC. The apparent viscosity at the temperature of 370° C. was 980 poise. 30 weight % of the same milled glass fiber as used in Example 1 was blended into 70 weight % of the obtained thermotropic liquid crystalline copolyester. The mixture was compounded by a twin-screw extruder of 30 mm φ (PCM-30) in which the maximum temperature of the cylinder was set at 370° C. The composition in which 30 weight % of glass fiber was blended (pellet) was obtained. A testing piece for measurement of the out-gases was injection-molded from this pellet according to the aforementioned molding method.

Similarly, 0.1 weight % of the phosphite ester P-1 was blended into the mixture of the thermotropic liquid crystalline copolyester and the milled glass fiber. Another pellet was thus obtained and from this pellet, another testing piece for measurement of the out-gases was produced.

The effective amount of acetic anhydride is shown in Table 1. The measurement results of the out-gases from the pellet and the molded testing piece made from the composition in which 30 weight % of glass fiber was blended are shown in Table 2.

Example 4

A device which was similar to that used in Example 1 was employed. Nitrogen substitution was carried out by repeating the process of "pressure reduction and nitrogen injection" of the polymerization reactor five times. 1,330.10 g (9.63 moles) of p-hydroxybezoic acid (HBA), 79.99 g (0.4815 moles) of isophthalic acid (IPA), 453.29 g (2.7285 moles) of terephthalic acid (TPA), 597.73 g (3.21 moles) of p,p'-biphenol (BP) and 0.35 g of magnesium acetate as a catalyst were charged in the polymerization reactor. The monomers in the polymerization reactor were mixed by stirring at the rotating rate of the stirring wing of 50 rpm. 2 g of the monomer mixture in the polymerization reactor was taken out of the reactor and the water content therein was measured. 0.180 weight % of water content was detected in the monomer mixture. In other words, 4.43 g (0.25 moles) of $H_2O$ was present in the polymerization reactor.

The monomer which had been taken out of the reactor for the measurement of water content therein was returned to the polymerization reactor and 1,703.88 g (16.69 moles) of acetic anhydride was added to the polymerization reactor. The temperature of the mixture was raised to 150° C. in 1 hour at the rotation rate of the stirring wing of 100 rpm and the acetylation reaction was carried out for 2 hours with acetic anhydride being refluxed. After the acetylation reaction was completed, the temperature was raised at the rate of 0.5° C./minute in a state in which distillation of acetic anhydride was allowed. The resulting polymers were taken out of the outlet provided at the lower portion of the polymerization reactor at 330° C.

The polymers which had been taken out of the reactor were milled by a mill in the order of 1 mm or less and the solid-phase polymerization was carried out by a solid-phase polymerization device having a cylindrical rotational reactor. Specifically, the polymers which had been milled as described above were charged into the reactor, the nitrogen was circulated at a rate of 1 litter/minute and the temperature was raised to 280° C. in 2 hours at a rotation rate of 20 rpm. The temperature was kept at 280° C. for 1 hour, raised to 300° C. in 30 minutes and kept at the temperature for 6 hours. The product was then cooled to the room temperature in 2.5 hours, resulting in the aimed polymer.

The melting point of the obtained polymer was 378° C. when measured by DSC. The apparent viscosity at the temperature of 410° C. was 910 poise.

30 weight % of the same milled glass fiber as used in Example 1 was blended into 70 weight % of the obtained thermotropic liquid crystalline copolyester. The mixture was compounded by a twin-screw extruder of 30 mm φ (PCM-30) in which the maximum temperature of the cylinder was set at 400° C. The composition in which 30 weight % of glass fiber was blended (pellet) was obtained. A testing piece for measurement of the out-gases was injection-molded from this pellet according to the aforementioned molding method.

Similarly, 0.1 weight % of the phosphate ester P-1 was blended into the mixture of the thermotropic liquid crystalline copolyester and the milled glass fiber. Another pellet was thus obtained and from this pellet, another testing piece for measurement of the out-gases was produced.

The effective amount of acetic anhydride is shown in Table 1. The measurement results of the out-gases from the pellet and the molded testing piece made from the composition in which 30 weight % of glass fiber was blended are shown in Table 2.

Example 5

A device which was similar to that used in Example 1 was employed. Nitrogen substitution was carried out by repeating the process of "pressure reduction and nitrogen injection" of the polymerization reactor five times. 1,330.10 g (9.63 moles) of p-hydroxybezoic acid (HBA), 79.99 g (0.4815 moles) of isophthalic acid (IPA), 453.29 g (2.7285 moles) of terephthalic acid (TPA), 597.73 g (3.21 moles) of p,p'-biphenol (BP) and 0.35 g of magnesium acetate as a catalyst were charged in the polymerization reactor. The monomers in the polymerization reactor were mixed by stirring at the rotating rate of the stirring wing of 50 rpm. 2 g of the monomer mixture in the polymerization reactor was taken out of the reactor and the water content therein was measured. 0.175 weight % of water content was detected in the monomer mixture. In other words, 4.31 g (0.24 moles) of $H_2O$ was present in the polymerization reactor.

The monomer which had been taken out of the reactor for the measurement of water content therein was returned to the polymerization reactor and 1,835.58 g (17.98 moles) of acetic anhydride was added to the polymerization reactor. The temperature of the mixture was raised to 150° C. in 1 hour at the rotation rate of the stirring wing of 100 rpm and the acetylation reaction was carried out for 2 hours with acetic anhydride being refluxed. After the acetylation reaction was completed, the temperature was raised at the rate of 0.5° C./minute in a state in which distillation of acetic anhydride was allowed. The resulting polymers were taken out of the outlet provided at the lower portion of the polymerization reactor at 330° C.

The polymers which had been taken out of the reactor were milled by a mill in the order of 1 mm or less and the solid-phase polymerization was carried out by a solid-phase polymerization device having a cylindrical rotational reactor. Specifically, the polymers which had been milled as described above were charged into the reactor, the nitrogen was circulated at a rate of 1 litter/minute and the temperature was raised to 280° C. in 2 hours at a rotation rate of 20 rpm. The temperature was kept at 280° C. for 1 hour, raised to 300° C. in 30 minutes and kept at the temperature for 4 hours. The product was then cooled to the room temperature in 2.5 hours, resulting in the aimed polymer.

The melting point of the obtained polymer was 376° C. when measured by DSC. The apparent viscosity at the temperature of 410° C. was 1,250 poise.

30 weight % of the same milled glass fiber as used in Example 1 was blended into 70 weight % of the obtained thermotropic liquid crystalline copolyester. The mixture was compounded by a twin-screw extruder of 30 mm φ (PCM-30) in which the maximum temperature of the cylinder was set at 400° C. The composition in which 30 weight % of glass fiber was blended (pellet) was obtained. A testing piece for measurement of the out-gases was injection-molded from this pellet according to the aforementioned molding method.

Similarly, 0.1 weight % of the phosphite ester P-1 was blended into the mixture of the thermotropic liquid crystallineline copolyester and the milled glass fiber. Another pellet was thus obtained and from this pellet, another testing piece for measurement of the out-gases was produced.

The effective amount of acetic anhydride is shown in Table 1. The measurement results of the out-gases from the pellet and the molded testing piece made from the composition in which 30 weight % of glass fiber was blended are shown in Table 2.

Example 6

A device which was similar to that used in Example 1 was employed. 1,330.10 g (9.63 moles) of p-hydroxybezoic acid (HBA), 79.99 g (0.4815 moles) of isophthalic acid (IPA), 453.29 g (2.7285 moles) of terephthalic acid (TPA), 597.73 g (3.21 moles) of p,p'-biphenol (BP) and 0.35 g of magnesium acetate as a catalyst were charged in the polymerization reactor. The temperature in the polymerization reactor was raised to 70° C. and the process of "pressure reduction ad nitrogen injection" was repeated five times with rotating the stirring wing at 50 rpm, effecting the nitrogen substitution and the drying of the monomers in the polymerization reactor. After the drying of the monomers was completed, 2 g of the monomer mixture in the polymerization reactor was taken out of the reactor and the water content therein was measured. 0.013 weight % of water content was detected in the monomer mixture. In other words, 0.32 g (0.02 moles) of $H_2O$ was present in the polymerization reactor.

The monomer which had been taken out of the reactor for the measurement of water content therein was returned to the polymerization reactor and 1,671.21 g (16.37 moles) of acetic anhydride was added to the polymerization reactor. The temperature of the mixture was raised to 150° C. in 1 hour at the rotation rate of the stirring wing of 100 rpm and the acetylation reaction was carried out for 2 hours with acetic anhydride being refluxed. After the acetylation reaction was completed, the temperature was raised at the rate of 0.5° C./minute in a state in which distillation of acetic anhydride was allowed. The resulting polymers were taken out of the outlet provided at the lower portion of the polymerization reactor at 330° C.

The polymers which had been taken out of the reactor were milled by a mill in the order of 1 mm or less and the solid-phase polymerization was carried out by a solid-phase polymerization device having a cylindrical rotational reactor. Specifically, the polymers which had been milled as described above were charged into the reactor, the nitrogen was circulated at a rate of 1 litter/minute and the temperature was raised to 280° C. in 2 hours at a rotation rate of 20 rpm. The temperature was kept at 280° C. for 1 hour, raised to 300° C. in 30 minutes and kept at the temperature for 6 hours. The product was then cooled to the room temperature in 2.5 hours, resulting in the aimed polymer.

The melting point of the obtained polymer was 379° C. when measured by DSC. The apparent viscosity at the temperature of 410° C. was 890 poise.

30 weight % of the same milled glass fiber as used in Example 1 was blended into 70 weight t of the obtained thermotropic liquid crystalline copolyester. The mixture was compounded by a twin-screw extruder of 30 mm φ (PCM-30) in which the maximum temperature of the cylinder was set at 400° C. The composition in which 30 weight % of glass fiber was blended (pellet) was obtained. A testing piece for measurement of the out-gases was injection-molded from this pellet according to the aforementioned molding method.

Similarly, 0.1 weight % of the phosphate ester P-1 was blended into the mixture of the thermotropic liquid crystalline copolyester and the milled glass fiber. Another pellet was thus obtained and from this pellet, another testing piece for measurement of the out-gases was produced.

The effective amount of acetic anhydride is shown in Table 1. The measurement results of the out-gases from the pellet and the molding (the testing piece) made from the composition in which 30 weight % of glass fiber was blended are shown in Table 2.

Examples 7–10

30 weight % of the same milled glass fiber as used in Example 1 was likewise blended into the thermotropic liquid crystalline copolyester obtained as a result of the solid-phase polymerization in Example 1. Further, in Example 7, bis(2, 4-di-tert-butylphenyl) pentaerythritol diphosphite (which will be referred to as "P-2" hereinafter) was added as 0.1 weight % of the phosphate ester. In Example 8, distearyl pentaerythritol diphosphite (which will be referred to as "P-3" hereinafter) was added as 0.1 weight % of the phosphate ester. In Example 9, 2,2'-methylene bis(4,6-di-tert-butylphenyl) octylphosphite (which will be referred to as "P-4" hereinafter) was added as 0.1 weight % of the phosphate ester. In Example 10, tri(2,4-di-tert-butylphenyl) phosphate (which will be referred to as "P-5" hereinafter) was added as 0.1 weight % of the phosphate ester. A pellet was thus produced in each of Examples 7–10. A molding (testing piece) was injection-molded from each pellet. It should be noted that the phosphate ester P-4 used in Example 9 and the phosphate ester P-5 used in Example 10 are phosphate esters which are not represented by the aforementioned general formula (1).

The measurement results of the out-gases from the molding (the testing piece) made from the composition in which 30 weight % of glass fiber was blended are shown in Table 2.

TABLE 1

Effective Amount of Acetic Anhydride in the Preparation of Thermotropic Liquid Crystalline Copolyester

| | Monomer OH mole A | Added Acetic Anhydride mole B | $H_2O$ in Monomer mole C | Effective Acetic Anhydride (B-C)/A |
|---|---|---|---|---|
| Example 1 | 16.05 | 17.33 | 0.24 | 1.065 |
| Example 2 | 16.05 | 17.04 | 0.02 | 1.060 |
| Example 3 | 16.05 | 17.49 | 0.27 | 1.073 |
| Example 4 | 16.05 | 16.69 | 0.25 | 1.024 |
| Example 5 | 16.05 | 17.98 | 0.24 | 1.105 |
| Example 6 | 16.05 | 16.37 | 0.02 | 1.019 |

TABLE 2

Measurement Results of Acetic Acid and Phenol Gas-Emission

| Example No. | Presence/Absence of Phosphite Additive | Pellet or Molded piece | Acetic Acid Gas (ppm) | Phenol Gas (ppm) |
|---|---|---|---|---|
| Example 1 | Absent | Pellet | 8 | 2 |
| | P-1 added | Molded piece | 7 | 7 |
| | 0.1 wt % | Pellet | 8 | 2 |
| | | Molded piece | 6 | 4 |
| Example 2 | Absent | Pellet | 3 | 2 |
| | P-1 added | Molded piece | 2 | 9 |
| | 0.1 wt % | Pellet | 3 | 1 |
| | | Molded piece | 3 | 3 |
| Example 3 | Absent | Pellet | 15 | 1 |
| | P-1 added | Molded piece | 13 | 6 |
| | 0.1 wt % | Pellet | 14 | 1 |
| | | Molded piece | 14 | 3 |
| Example 4 | Absent | Pellet | 0 | 35 |
| | P-1 added | Molded piece | 0 | 49 |
| | 0.1 wt % | Pellet | 0 | 23 |
| | | Molded piece | 0 | 34 |
| Example 5 | Absent | Pellet | 89 | 1 |
| | P-1 added | Molded piece | 82 | 6 |
| | 0.1 wt % | Pellet | 88 | 1 |
| | | Molded piece | 86 | 3 |
| Example 6 | Absent | Pellet | 0 | 44 |
| | P-1 added | Molded piece | 0 | 52 |
| | 0.1 wt % | Pellet | 0 | 29 |
| | | Molded piece | 0 | 34 |
| Example 7 | P-2 added 0.1 wt % | Molded piece | 8 | 2 |
| Example 8 | P-3 added 0.1 wt % | Molded piece | 7 | 2 |
| Example 9 | P-4 added 0.1 wt % | Molded piece | 8 | 8 |
| Example 10 | P-5 added 0.1 wt % | Molded piece | 6 | 7 |

As shown in Table 1, the effective amount of acetic anhydride is within the range of 1.04 to 1.08 in Example 1, Example 2 and Example 3. On the other hand, in Example 4 and Example 6, the effective amount of acetic anhydride is less than 1.04. In Example 5, the effective amount of acetic anhydride is larger than 1.08. According to the measurement results of the out-gas emission shown in Table 2, in a case in which the effective amount of acetic anhydride is relatively small as in Example 4 and Example 6, acetic anhydride was not detected but a relatively large amount of phenol was detected. In a case in which the effective amount of acetic anhydride is relatively large as Example 5, a very small amount of phenol gas was detected but a relatively large amount of acetic gas was emitted.

As compared with Examples 4–6, Examples 1–3 whose effective amount of acetic anhydride was within the range of 1.04 to 1.08 showed excellent results in which the amount of emission of acetic acid and phenol gases was very small.

From these results, it is clearly understood that the thermotropic liquid crystalline copolyester produced according to the production method of the present invention emits a very small amount of acetic acid and phenol gases.

According to the present invention, in a method in which a thermotropic liquid crystalline copolyester is produced by first acetylating the hydroxyl group of monomers by acetic anhydride and then performing melt polymerization (or two-stage polymerization of melt polymerization and solid-phase polymerization), it is possible to provide a liquid crystalline copolyester which emits a very small amount of acetic acid and phenol gases by limiting the amount of acetic anhydride to a specific range.

Further, in the present invention, a phosphate ester having a specific structure is blended into the thermotropic liquid crystalline copolyester produced by first performing acetylation by a specific amount of excessive acetic anhydride and then melt polymerization or two-stage polymerization of melt polymerization and solid-phase polymerization. As a result, it is possible to provide a thermotropic liquid crystalline copolyester resin composition which emits a very small amount of phenol gas.

The thermotropic liquid crystalline copolyester of the present invention emits a very small amount of the corrosive out-gases which may corrode metal-made conductive portions (such as a circuit) of an electric/electronic component, although the copolyester is used for a long period or in a high temperature environment (e.g. the soldering process, the mounting-to-surface process). Accordingly, various functions of the component in which said resin is used as a forming material can be reliably maintained.

For example, when the thermotropic liquid crystalline copolyester of the present invention is employed as a forming material of various components used in HDD (a carriage, a chassis, a VCM coil holding portion of an actuator, a member for accommodating a head in an non-operation state), FDD and an optical disc drive, the amount of the corrosive out-gases emitted from these components is decreased and thus the stability in the data-reading function is improved.

Especially, when the thermotropic liquid crystalline copolyester is employed in electric/electronic components having a metal-made conductive portion which is structurally vulnerable to the corrosive gases emitted from the resin (such as a relay, a connector, a socket, a resistor, a condenser, a motor, an oscillator, a printed circuit board, and a power module), problems like an initial failure caused by the formation of a corrosive film as a result of oxidization of the contact portion by the corrosive out-gases and the like and an contact failure caused by the formation of layers of carbonized materials at the application of voltage can be solved. Accordingly, the various functions of these components can be reliably maintained. Specifically, in a relay and a switch having electric contact portions, solving the aforementioned problems means that the various functions of these components can be reliably maintained and thus the quality of these components is improved as a whole.

The emission of the corrosive gases tends to be accelerated by blending fillers into the resin. However, emission of the corrosive gases can be suppressed at a practically acceptable level by preferably blending a specific phosphate ester into the resin, although the resin itself would easily emit the corrosive gases by blending of fillers.

What is claimed is:

1. An electric/electronic component comprising:

a resin portion; and a metal-made conductive portion, wherein the resin portion is made of the thermotropic liquid crystalline copolyester obtained by.

(1) charging in a reactor 5-100 mol % of aromatic hydroxycarboxylic acid, 0-47.5 mol % of aromatic dicarboxylic acid and 0-47.5 mol % of aromatic diol, so that the sum of mol % of each material is 100 mol % and the mol % of aromatic dicarboxylic acid and that of aromatic diol are substantially equal;

(2) adding acetic anhydride of an amount which satisfies the formula below, $$(B-C)/A > 1.04$$

"A" represents the total molar number of the hydroxy group in a reaction system, "B" represents the molar number of acetic anhydride to be added, and "C" represents the molar number of water present in the reaction system prior to addition of acetic anhydride;

(3) acetylation;

(4) melt polymerization; and (5) solid-phase polymerization.

2. An electric/electronic component comprising:

a resin portion; and a metal-made conductive portion, wherein the resin portion is made of the thermotropic liquid crystalline copolyester resin composition including (1) 100 parts by weight of the thermotropic liquid crystalline copolyester obtained by (a) charging in a reactor 5-100 mol % of aromatic hydroxcarboxylic acid, 0-47.5 mol % of aromatic dicarboxylic acid and 0-47.5 mol % of aromatic diol, so that the sum of mol % of each material is 100 mol % and the mol % of aromatic dicarboxylic acid and that of aromatic diol are substantially equal, (b) adding acetic anhydride of an amount which satisfies the formula below, $$(B-C)/A > 1.04$$

"A" represents the total molar number of the hydroxy group in a reaction system, "B" represents the molar number of the acetic anhydride to be added, and "C" represents the molar number of water present in the reaction system prior to addition of acetic anhydride, (c) acetylation, (b) melt polymerization, and (e) solid-phase polymerization; and (2) 0.001-1 parts by weight of at least one phosphite ester having the general formula (1):

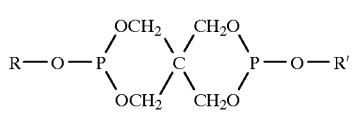

(1)

wherein R and R' each represent a group selected from the group consisting of alkyl group, alkenyl group, aryl group and aralkyl group, and R and R' may represent the same group.

3. An electric/electronic component comprising:
a resin portion; and
a metal-made conductive portion,
wherein the resin portion is made of a thermotropic liquid crystalline copolyester composition comprising:
(1) 100 parts by weight of the thermotropic liquid crystalline copolyester obtained by the steps of
(a) charging in a reactor 5–100 mol % of aromatic hydroxycarboxylic acid, 0–47.5 mol % of aromatic dicarboxylic acid and 0–47.5 mol % of aromatic diol, so that the sum of mol % of each material is 100 mol % and the mol % of aromatic dicarboxylic acid and that of aromatic diol are substantially equal;
(b) adding acetic anhydride of an amount which satisfies the formula below, $$1.08 \geq (B-C)/A \geq 1.04$$

"A" represents the total molar number of the hydroxy group in a reaction system, "B" represents the molar number of the acetic anhydride to be added, and "C" represents the molar number of water present in the reaction system prior to addition of acetic anhydride;
(c) acetylation;
(d) melt polymerization;
(e) solid-phase polymerization to produce a thermotropic liquid crystalline copolyester;
(2) 0.001–1 parts by weight of at least one phosphorous acid ester having the general formula (1):

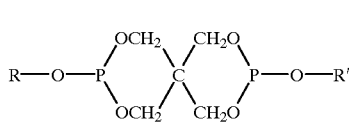

(I)

wherein R and R' each represent a group selected from the group consisting of alkyl group, alkenyl group, aryl group and aralkyl group, and R and R' may represent the same group; and
(3) inorganic or organic fillers within the range of 10 to 90 weight % of the whole composition.

* * * * *